AFC FOR DIVERSE FREQUENCY SOURCES
Filed June 28, 1966
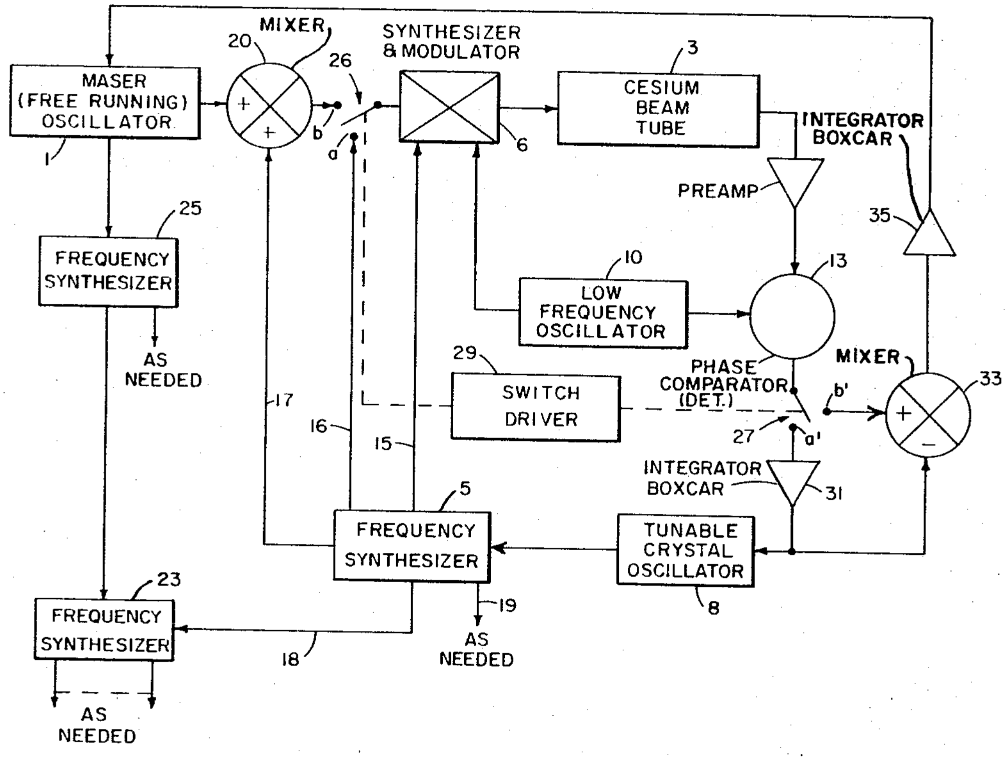
Guntis Brunins,
INVENTOR.
BY Harry M. Saragovitz
Edward J. Kelly
Herbert Berl
Robert C. Sims 3,348,164
Patented Oct. 17, 1967

3,348,164

AFC FOR DIVERSE FREQUENCY SOURCES

Guntis Brunins, Hyattsville, Md., assignor, by mesne assignments, to the United States of America as represented by the Secretary of the Army Filed June 28, 1966, Ser. No. 561,300
6 Claims. (Cl. 331—2)

ABSTRACT OF THE DISCLOSURE

A cesium 133 (rubidium) atom beam tube and a high Q variable frequency oscillator are used as sources of stable low frequency signals. A maser is used as a high frequency source and is controlled through a first storage or integrator unit and frequency synthesizers by a control circuit which uses the atom beam tube as a reference frequency. The same control circuit is used to control the high Q oscillator through frequency synthesizers and a second storage or integrator unit. The frequency synthesizers are supplied by the oscillator. The error signal generated by the control circuit to the first storage unit is modified by subtracting the error signal generated previously to the second storage unit.

The short term stability of a free-running maser is of the order of several parts in $10^{12}$. This indicates the maser to be a source of extremely monochromatic signal. Its output is within the microwave region and is variable, depending on the material used. However, the maser's long term stability and frequency repeatability is somewhat dependent upon the operating conditions. In the past, to obtain phase locked microwave signals, it has been necessary to do considerable amounts of frequency multiplication on a crystal oscillator. Even though a crystal oscillator has a relatively high Q, large multiplication factors are necessary to get the frequency up to the microwave level. This also multiplies the modulation index; therefore, lowering the Q of the output. This can impose severe requirements on the "front-end" of any frequency synthesizer unit.

It is an object of the present invention to provide a fixed frequency generator.

A further object of this invention is to provide phase locked microwave signals.

A still further object of the invention is to provide a maser with long term frequency correction.

The invention further resides in and is characterized by various novel features of construction, combinations, and arrangements of parts which are pointed out with particularity in the claims annexed to and forming a part of this specification. Complete understanding of the invention and an introduction to other objects and features, not specifically mentioned, will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein: the single drawings shows a block diagram representation of a preferred embodiment of the present invention.

In order to use a maser (1 of the figure) as a source of high frequency (in the microwave region) monochromatic signal, a means must be provided for correcting its long term drift. An excellent long term frequency reference source is the cesium (Cs 133) atomic beam tube 3 when used as a high Q resonator. Of course, it also has good short time stability, but so does the maser. In place of Cs 133, it is possible to use any other of the known systems, such as a rubidium 87 vapor standard. However, in order to compare the maser's output (in the microwave region, with an ammonia beam, its frequency output to 23,870 mc./s.) with that of cesium atomic beam tube 3 (9192.631830 mc./s.), requires some frequency synthesizing.

In order to provide power for the synthesizers 5 and 6, another reference source is needed. A tunable crystal oscillator 8 is a highly stable (high Q crystal thermally stabilized, etc.) voltage tunable oscillator. The synthesizer 5 consists of dividers, multipliers, mixers, filters, amplifiers, etc. used to produce frequencies higher or lower than some reference. The synthesizer and modulator 6 is also used to produce a phase (frequency) modulated 9192.631830 mc./s. when a cesium beam tube is used. A low frequency oscillator 10 provides the power to modulate the input to beam tube 3. Tunable crystal oscillator 8 must be referenced by the cesium beam tube in order for the system to operate; however, this is not necessary with low frequency oscillator 10 as it is in a closed loop and is used only to detect changes in phase with respect to itself by way of a phase comparator or detector 13. Phase comparator 13 converts error information carried at modulation frequency to a specific D.C. level to correct tunable oscillator 8 and the maser.

Frequency synthesizer 5 has a plurality of outputs 15–19. The output 17, when mixed with the maser signal by mixer 20, will cause the mixer to have an output of 9192.631840 mc./s., the frequency of cesium beam tube 3. If needed, further synthesizing may be done to the output of the mixer by the synthesizer and modulator 6 in order to obtain the cesium beam tube frequency. Output 16 is designed to be the same output as would come from the mixers, but is due only to the power of the crystal oscillator. Output 18 of synthesizer 5 is an output designed to combine and help synthesizer 23 to produce the final otuputs desired. This output may also be fed to a synthesizer in the output of any other maser which may be used in this system. By having two stable frequency sources 1 and 8 separated in frequency, any number of frequencies of excellent spectral purity and stability can be generated. Other synthesizers, such as synthesizer 25, may be used in front of the final synthesizer, if needed. Output 19 is provided as an extra output to be used as needed.

Switches 26 and 27 are driven by a switch driver 29. These switches may be of any conventional type such as solid state, rotary, etc. The switches have contacts *a*, *b*, *a'*, and *b'* and are switched simultaneously such that when switch 26 is on contact or position *a*; switch 27 is on contact *a'*, and when switch 26 is on contact *b*, switch 27 is on contact *b'*.

The criterion for providing an error correction to any one of several phase locked oscillators is established by their individual frequency drift rates. In other words, if a free running oscillator retains its stability over, for example, a one second period, the error correction need not be updated more than several times a second. In fact, a crystal controlled oscillator, housed in an inexpensive oven can be relied to hold its stability over a one second time interval. Thus, the cesium beam tube can be time shared, being a common element in several phase locking loops.

*Operation*

To phase lock crytsal controlled oscillator 8, switches 26 and 27 are set on positions *a* and *a'* respectively. In this mode high Q crystal oscillator 8, operating in conjunction with the synthesizer is the only source of input signal to beam tube 3. This input signal is modulated in modulator 6 by low frequency oscillator 10. The input signal to the cesium beam tube will vary in frequency at the rate of the frequency of oscillator 10, therefore causing an output of tube 3 to have the same frequency as that of oscillator 10. The phase of this output is dependent upon the synthesized frequency of oscillator 8; therefore, the output of phase comparator 13 is a measure of the error in frequency (phase) of the input signal. If required, the phase detector now will produce a D.C. error correction to shift the frequency of oscillator 8. This error correction is fed to the integrator boxcar unit 31 where it is integrated and stored. Boxcar 31 applies an average error voltage to the varactor of crystal oscillator 8 so as to stabilize its frequency with respect to the beam tube reference.

This process takes only a fraction of a second. The tunable crystal oscillator will retain its stability for at least a fraction of a second, as will the maser. To hold the frequency stable until the next correction is applied, the output from comparator 13 is stored by boxcar 31 until the next correction is applied. Therefore, one can now break the loop and proceed to correct the frequency of the maser.

In the second mode, switches 26 and 27 are closed on positions *b* and *b'*, respectively. The input to the cesium beam tube now is produced by mixing the output from the maser with an output 17 from frequency synthesizer 5. Thus, the output from the phase comparator will be a measure of both the error in frequency of the maser and the error in frequency of oscillator 8. This output from phase comparator 13 is fed to mixer 33 where the output of boxcar 31, produced in the previous cycle, is subtracted therefrom. The output from mixer 33 will now be a measure of the maser's long term frequency drift and is boxcarried by boxcar 35 and applied to the maser's frequency control system.

The output from boxcar 31 is subtracted from the output of the phase comparator to eliminate any frequency (phase) error due to error in the frequency of oscillator 8. Although the frequency of oscillator 8 is being corrected by the signal stored on boxcar 31, this correction takes a finite time. Therefore, for a brief interval after a transient disturbance affecting oscillator 8, the error measurement of phase comparator 13 will not be a function of only the maser's frequency error, but a combination of the error of oscillator 8 and that of the maser. Hence, the subtraction is performed by mixer 33 to assure an independent measurement of the frequency error of the maser's signal. The final difference is boxcarried by integrator boxcar 35 to the maser, and the modes are cycled again.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the are that changes may be made in the form of the apparatus disclosed without departing from the spirit of the invention as set forth in the disclosure, and that in some cases, certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

I claim:

1. A regulating system comprising: first and second controllable frequency generating means having outputs of different frequencies, frequency error detecting means being constructed such that an error correcting voltage will be produced upon receipt of an input voltage of a frequency other than a predetermined frequency, said controllable frequency generating means each having an output and a frequency correcting input, a frequency changing means connected to and supplied by said second frequency generating means, first switching means adapted to selectively connect the outputs of said generating means to an input of said detecting means by way of said frequency changing means, second switching means adapted to selectively connect said error correcting voltage to the frequency correcting input of the generating means, and switch driving means for driving said switches such that said first and second controllable frequency generating means will time share said frequency error detecting means and be corrected thereby.

2. A regulating system as set forth in claim 1, wherein said first generating means is a maser device.

3. A regulating system as set forth in claim 1, further comprising first and second boxcar means connected between said second switching means and the frequency correcting inputs of said first and second generating means respectively.

4. A regulating system as set forth in claim 3, further comprising a mixer means connected between said second switching means and said first boxcar means, and wherein said mixer means is further connected to an output of said second boxcar means so as to subtract the second boxcar means' output from said error correcting voltage and supply the difference to an input of said first boxcar means.

5. A regulating system as set forth in claim 4, further comprising a frequency mixing means having first and second inputs and an output, a frequency synthesizer having a first output connected to the first input of said mixing means, said synthesizer being connected to and supplied by said second frequency generating means, a second output of the synthesizer providing the connection of the second frequency generating means to said first switching means, the second input of said mixing means and its output being connected between the output of said first generating means and said first switching means, whereby the output of the frequency changing means will be equal to said predetermined frequency when the frequencies of said generating means are at first and second predetermined values, and wherein said second generating means is a tunable oscillator.

6. A regulating system as set forth in claim 3, wherein said first generating means is a maser having a frequency output in the microwave range and said second generating means is a tunable crystal oscillator.

References Cited

UNITED STATES PATENTS 3,277,389 10/1966 Venn ---------------- 331—2

JOHN KOMINSKI, *Primary Examiner.*